United States Patent [19]

Nier et al.

[11] 3,768,077

[45] Oct. 23, 1973

[54] DATA PROCESSOR WITH REFLECT CAPABILITY FOR SHIFT OPERATIONS

[75] Inventors: Richard E. Nier, Apalachin; Donald E. Waldecker, Endicott, both of N.Y.

[73] Assignee: International Business Machines Corporation, Armonk, N.Y.

[22] Filed: Apr. 24, 1972

[21] Appl. No.: 246,795

[52] U.S. Cl. .......... 340/172.5
[51] Int. Cl. .......... G06f 7/39
[58] Field of Search .......... 340/172.5; 235/156, 235/159, 160, 164

[56] References Cited

UNITED STATES PATENTS 3,400,371 9/1968 Amdahl et al. .......... 340/172.5
3,510,846 5/1970 Goldschmidt .......... 340/172.5

*Primary Examiner*—Harvey E. Springborn
*Attorney*—George E. Clark et al.

[57] ABSTRACT

A data processor is described in which general purpose registers having a unidirectional shift capability are employed in conjunction with a reflect operation to effectively execute multiply or divide operations. The outputs of a register having unidirectional shift capability are presented to one set of inputs on an input multiplexor of an arithmetic logic unit (ALU) in normal bit order for operations requiring no shift or a right shift. They are also presented to a second set of inputs on the input multiplexor of the ALU in bit reversed order to provide a reflect capability in data flow from the register, through the ALU, and back to the input of the register.

5 Claims, 4 Drawing Figures

| | A CONTENTS | Q CONTENTS |
|---|---|---|
| INITIALLY | $d_0$ $d_1$ $d_2$ $d_3$ | $d_4$ $d_5$ $d_6$ $d_7$ |
| AFTER INTERATION 1 | $r_{10}$ $r_{11}$ $r_{12}$ $d_4$ | $d_5$ $d_6$ $d_7$ $q_0$ |
| AFTER INTERATION 2 | $r_{20}$ $r_{21}$ $r_{22}$ $d_5$ | $d_6$ $d_7$ $q_0$ $q_1$ |
| AFTER INTERATION 3 | $r_{30}$ $r_{31}$ $r_{32}$ $d_6$ | $d_7$ $q_0$ $q_1$ $q_2$ |
| AFTER INTERATION 4 | $r_{40}$ $r_{41}$ $r_{42}$ $d_7$ | $q_0$ $q_1$ $q_2$ $q_3$ ← FINAL RESULT |

PRIOR ART

FIG. 3

| | A CONTENTS | Q CONTENTS |
|---|---|---|
| INITIALLY | $d_0$ $d_1$ $d_2$ $d_3$ | $d_4$ $d_5$ $d_6$ $d_7$ |
| AFTER REFLECTION | $d_0$ $d_1$ $d_2$ $d_3$ | $d_7$ $d_6$ $d_5$ $d_4$ |
| AFTER INTERATION | $r_{10}$ $r_{11}$ $r_{12}$ $d_4$ | $q_0$ $d_7$ $d_6$ $d_5$ |
| AFTER INTERATION | $r_{20}$ $r_{21}$ $r_{22}$ $d_5$ | $q_1$ $q_0$ $d_7$ $d_6$ |
| AFTER INTERATION | $r_{30}$ $r_{31}$ $r_{32}$ $d_6$ | $q_2$ $q_1$ $q_0$ $d_7$ |
| AFTER INTERATION 4 | $r_{40}$ $r_{41}$ $r_{42}$ $d_7$ | $q_3$ $q_2$ $q_1$ $q_0$ |
| AFTER FINAL Q REFLECTION | $r_{40}$ $r_{41}$ $r_{42}$ $d_7$ | $q_0$ $q_1$ $q_2$ $q_3$ ← FINAL RESULT |

Q REFLECTED OPERATION

FIG. 4

DATA PROCESSOR WITH REFLECT CAPABILITY FOR SHIFT OPERATIONS

The invention herein described was made in the course of, or under a contract, or subcontract thereunder, with the Department of the Navy.

BACKGROUND OF THE INVENTION

The present invention relates to data processors and more particularly to data processors including shift registers for performing arithmetic and logic operations.

In the prior art, there were two widely accepted methods of providing an effective bidirectional shift in a shift register.

The first and most obvious is the inclusion of the capability to shift in either direction in the design of the shift register. The use of bidirectional shift registers requires additional logic and gating and also adds time delay to each processor cycle. For example, a division process would require $n$ iterations in an $n$ bit computer where the time required for each iteration is $t$ plus $d$ where $d$ is the logic delay of the extra logic required in the critical data path.

A second technique is to achieve a left shift of one position by executing a right circular shift of $n$ minus 1 positions. This technique is very time-consuming since each processor cycle must allow time for the $n$ minus 1 right circular shift to occur. Using this technique, a divide operation would require $n$ iterations but each iteration must have sufficient time to permit the $n$ minus 1 bit shift which considerably lengthens divide execution time.

SUMMARY OF THE INVENTION

Therefore, it is a primary object of the present invention to execute logic and arithmetic operations in a data processor which includes unidirectional shift registers.

It is another object of the present invention to execute logic and arithmetic operations in a data processor which includes unidirectional shift registers by employing means to execute a reflect operation in the data path output of the register.

It is a further object of the present invention to execute divide operations in a data processor including means to execute a reflect operation in the data flow.

It is a still further object of the present invention to execute logic and arithmetic operations in a minimum amount of time with a minimum number of logic circuits.

Accordingly, apparatus and method according to the present invention includes a data processor for executing arithmetic and logic operations including a unidirectional shift register, a means for loading information to be shifted into the register, means for gating the information to be shifted to an arithmetic logic unit in a first bit order, means for gating the information to be shifted to an arithmetic logic unit in a second bit order which is the reverse order from the first bit order, an arithmetic logic unit for executing arithmetic functions, and control means for controlling the sequence of operations of the data processor.

A method of executing arithmetic and logical operations in a data processor including a unidirectional shift register includes the steps of, loading the information to be shifted into the register, gating the information to be shifted to an arithmetic logic unit in a bit reversed order, reflecting the bit reversed information to the input of the register, executing an operation such as divide requiring a shift other than that normally capable of execution by the register, and reflecting the result of the operation such as divide through the arithmetic logic unit to the register in a corrected bit order.

An important advantage of apparatus or method for data processing according to the present invention is that low cost standardized register modules may be used for a variety of functions in a data processor to reduce cost without sacrificing speed of operation.

The foregoing and other objects, features and advantages of the present invention will be apparent from the following more particular description of preferred embodiments of the invention, as illustrated in the accompanying drawings.

BRIEF DESCRIPTION OF THE DRAWINGS

FIG. 3 is a chart showing the contents of the A and Q registers during the progress of a divide operation according to the prior art methods.

FIG. 4 is a chart showing the contents of the A and Q registers during the execution of a divide operation according to the method of the present invention.

DETAILED DESCRIPTION

Figure 1:
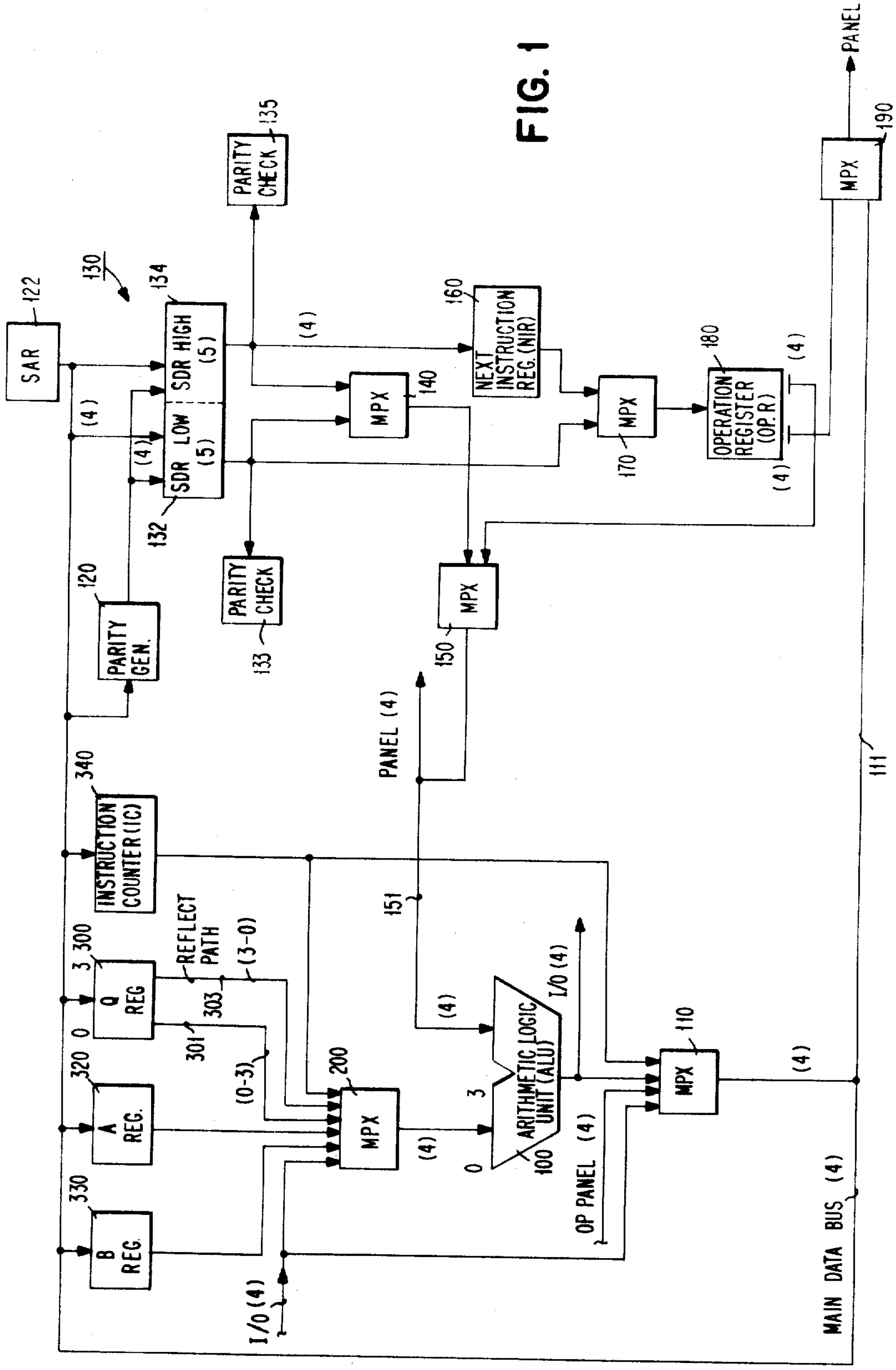
FIG. 1 is a block diagram of a data processor data flow embodying the present invention.

To aid in understanding the present invention, a divide operation will be described first according to the prior art shown in FIG. 3 under the assumption that registers A 320 and Q 300 shown in FIGS. 1 and 2 have the capability of shifting left or right.

In the prior art, as a first step, the $2n$ bit ($n$=4 in this example) dividend is loaded into registers A 320 and Q 300. The divisor is connected by lines 151 to inputs of ALU 100 on the right side.

Each of the $n$ iterations in a divide operation requires the following operation:

$A' = A \pm DV$ left shift one.

Where:

$A'$ is the new content of the A register $A$ is the old content of the A register $DV$ is the divisor This means that the divisor is added to or subtracted from the contents of the A register depending upon the sign of A and the sign of the divisor, the result is left shifted 1 position and placed into the A register.

In this prior art operation, the low order bit position of the ALU output multiplexor 110 is filled from the high order bit position of the Q register 300. As the A register 320 is loaded with the iteration result, the Q register 300 is shifted left one position. As this Q shift occurs, a quotient bit is placed into the low order bit position of the Q register and the high order Q bit is discarded.

More specifically referring to FIG. 3, an 8 bit ($2n$) dividend is placed in the A and Q registers with the high order dividend bit position $d0$ at the high order position of the A register 320 and the low order dividend bit position $d7$ at the low order bit position of the Q register 300. After a first iteration, iteration results $r10$, $r11$, $r12$ occupy the three high order bit positions in the A register and bit $d4$ of the dividend has been shifted from the high order bit position in the Q register to the low order bit position in the A register. The Q register then contains in the three high order bit positions dividend bits *d5*, *d6*, and *d7* and quotient bit *q0* in the low order bit position.

After a second iteration, iteration result bits *r20*, *r21*, and *r22* occupy the three high order bits of the A register and dividend bit *d5* occupies the low order bit position of the A register 320. The Q register 300 has been shifted two positions to the left and now contains dividend bits *d6* and *d7* in the two high order bit positions and quotient bits *q0* and *q1* in the two low order bit positions.

After a third iteration, iteration result bits *r30*, *r31* and *r32* occupy the three high order bit positions of the A register and dividend bit *d6* occupies the low order bit position of the A register. The Q register now contains in the high order bit position, dividend bit *d7* and in the three low order bit positions quotient bits *q0*, *q1* and *q2* which have been shifted one additional position to the left.

After a fourth and final iteration, iteration resulting bits *r40*, *r41* and *r42* occupy the three high order bit positions of the A register and dividend bit *d7* occupies the low order bit position of the A register. The Q register now contains the four bits of the quotient which have been shifted into the Q register in a manner such that the high order quotient bit *q0* occupies the high order bit position of the Q register and the low order quotient bit *q3* occupies the low order bit position of the Q register.

Apparatus and controls for executing the divide operation according to the prior art method are generally described in U. S. Pat. No. 3,400,371 particularly at columns 191 to 193. The same controls for divide operations will also be applicable to apparatus constructed according to the present invention with the additional reflect operation as is shown in FIG. 2 which will be described below.

Figure 2:
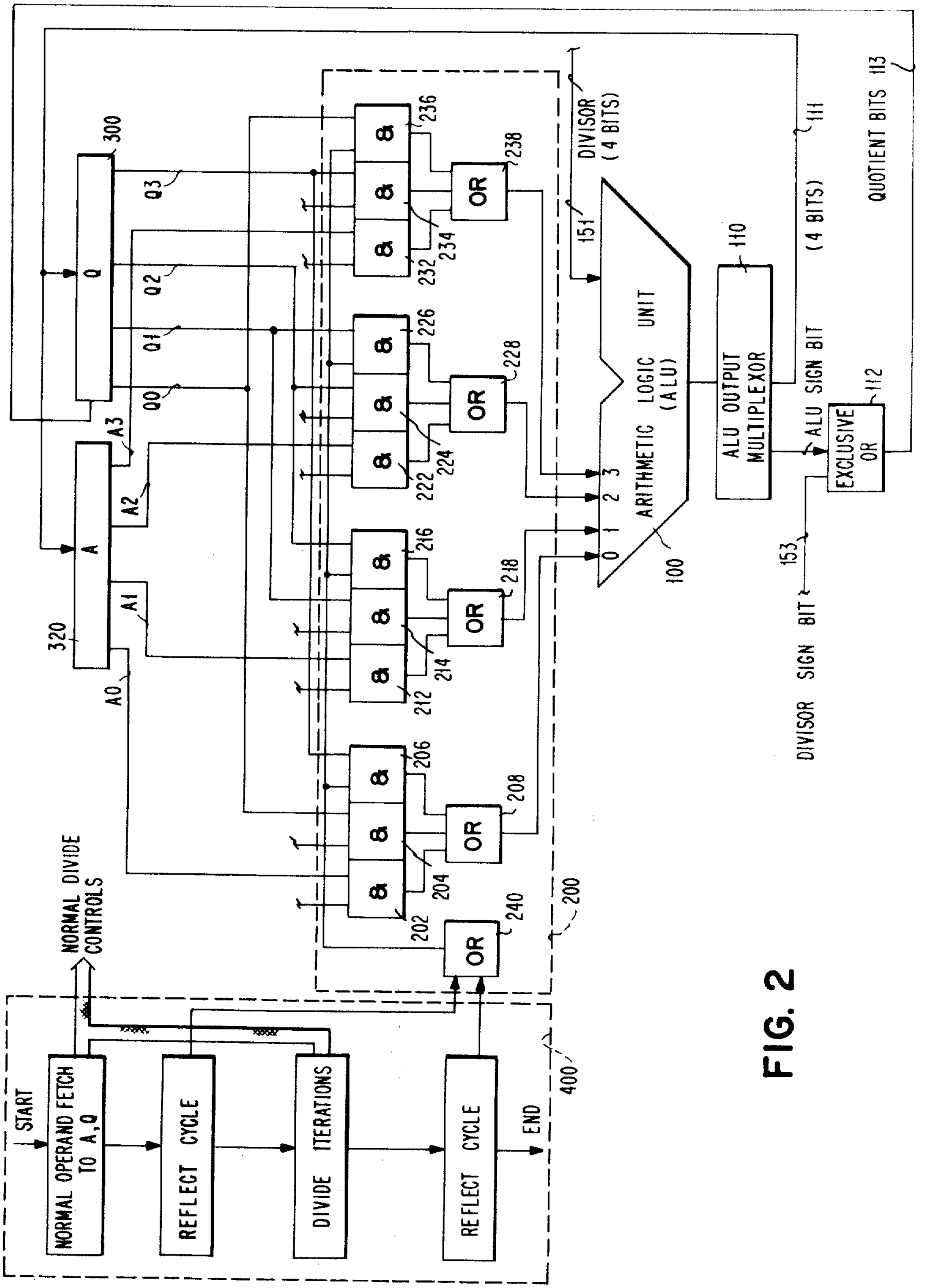
FIG. 2 is a logical block diagram of a portion of a data processing unit showing in greater detail logic circuitry embodying the present invention.

Referring now to FIGS. 1, 2 and 4, apparatus and method according to the present invention will be described in detail.

Currently available logic modules are commonly packaged such that the number of available inputs to a particular module is an even power of 2 such as 2, 4, or 8. Specifically, multiplexor 200 which is the input multiplexor to arithmetic logic unit 100 normally requires at least five sets of inputs.

Since input multiplexor 200 requires at least five sets of inputs, an 8-input unit must be used due to packaging limitations. This being the case, no additional logic need be added to implement a reflect path such as reflect path 303 from Q register 300 as shown in FIGS. 1 and 2. Therefore, a more efficient use of available logic circuits enables the data processor to perform divide operations and multiply operations with a register such as the Q register 300 having the capability of shifting in one direction only, for example to the right as for a multiply operation.

The logic element shown in block diagram form in FIGS. 1 and 2 are all elements which are well known in the art as for example U. S. Pat. No. 3,400,371. To execute a divide operation employing the reflect capability of the data processor shown in FIGS. 1 and 2, a dividend is initially loaded into A register 320 and Q register 300 from storage (not shown) under the control of operation register 180, instruction counter 340, SAR 122, SDR 130, and next instruction register 160 with associated multiplexors 140, 170 and 150. FIG. 4 shows the initial contents of the A register 320 and the Q register 300 of the 8-bit dividend with the high order bit in the high order position of the A register and the low order bit in the low order bit position of the Q register. A reflect operation is next executed which causes the outputs of Q register 300 on reflect path 303 to be gated through multiplexor 200 and more specifically through gates 206, 216, 226, and 236 in bit reversed order to ALU 100 with Q register bit 3 being connected to ALU bit zero, Q register bit 2 being connected to ALU bit 1, Q register bit 1 being connected to ALU bit 2 and Q register bit zero being connected to ALU bit position 3. The reflected contents are then passed through ALU 100, ALU multiplexor 110 and loaded into Q register 300 as shown in FIG. 4 "after reflection." The divide operation may now continue as discussed above with the exception that the quotient bits *q0* through *q3* now enter Q register 300 from the high order bit position and are shifted to the right so that the result after the proper number of iterations is that the 4-bit quotient is contained in the Q register 300 in bit reversed order.

During the execution of the divide iterations, the contents of the Q register are gated on lines 301 through multiplexor 200 to ALU 100 directly, without bit order reversal and more specifically, Q register bit position 3 is gated through gates 234 and OR circuit 238 to ALU bit 3, Q register bit 2 through gates 224 and 228 to ALU bit position 2, Q register bit 1 through gates 214 and 218 to ALU bit position 1 and Q register bit 0 through gates 204 and 208 to ALU bit position 0. The arithmetic logic unit 100 performs the repetitive subtractions comprising the divide operation with the divisor being presented on lines 151 to the right hand inputs of ALU 100. The ALU sign bit output of ALU output multiplexor 110 is connected as one input to exclusive OR 112 with the divisor sign bit on line 153 as a second input. The output of exclusive OR 112, line 113 is the quotient bit which is presented to the high order bit position of Q register 300. Control element 400 controls the sequence of operations for a divide operation and includes two reflect cycles which are combined in OR gate 240 to present enabling lines to gates 206, 216, 226 and 236 to enable reflect path 303 to be presented to the inputs of ALU 100.

Control element 400 may be implemented as a microprogram in a read only storage or other control storage device such as is described in U. S. Pat. No. 3,400,371.

Particularly with respect to a divide operation, control 400, after a start signal is received, fetches operands into the A and Q registers as is well known in the prior art.

The reflect cycle is then initated to place the data in the Q register 300 in the proper form to utilize the right shift only register capability. The divide iterations of a standard divide operation as is well known in the prior art are performed. When completed, a second reflect cycle is executed to place the quotient in the Q register 300 in proper bit order. This allows the final result of the divide operation to appear in usable fashion in the Q register 300.

The implementation of the reflect operation for a divide operation adds no extra hardware to the data flow as is done by several prior art methods. Execution of a divide operation according to the present invention requires $n+2$, iterations rather than $n$ iterations required by the prior art method but each iteration is of a length $t$ where $t$ is the time of an execution cycle rather than length $t$ plus $d$ where $d$ is the additional delay time added by logic circuits as in the prior art since there is no additional delay inserted from additional logic circuits.

Although the reflect operation is described above in connection with a divide operation, it could be used for any operation requiring both left and right shifts when the available register is capable of performing only a single direction shift. Therefore, it might be used for square root, computer shift, or other instructions as well as in a design of logic in units other than data processors.

While the invention has been particularly shown and described with reference to the preferred embodiments thereof, it will be understood by those skilled in the art that various changes in form and details may be made therein without departing from the spirit and scope of the invention.

What is claimed is:

1. In a data processor, apparatus for executing multiply and divide operations, comprising:

a shift register having the capability of shifting data to the right;

an arithmetic logic unit for performing multiply and divide iterations;

first means for gating outputs of said register to said arithmetic logic unit in bit reversed order such that the high order bit of said register appears at the low order bit position of said arithmetic logic unit and a low order bit from said register appears as a high order bit position in said arithmetic logic unit;

second means for gating outputs of said register to inputs of said arithmetic logic unit in correct bit order;

microprogram control means for controlling the operation of said first and second gating means; and means for generating arithmetic result bits in response to iterative steps executed by said arithmetic logic unit.

2. Apparatus for executing logic operations in a data processor, comprising:

an arithmetic logic unit having a plurality of inputs and outputs;

an input multiplexor having a plurality of sets of inputs and having an output connected to a first set of inputs of said arithmetic logic units;

a unidirectional shift register having a plurality of stages, each stage having an output connected to one of a first set of inputs of said input multiplexor in a first bit order and being connected to a second set of inputs of said input multiplexor in a second bit order reversed from said first bit order; and control means for generating a plurality of control signals for controlling the execution of logic operations in said arithmetic logic unit.

3. Apparatus for executing logic operations in a data processor, comprising:

an arithmetic logic unit having a plurality of inputs and an output;

an input multiplexor having a plurality of sets of inputs and having an output connected to a first set of inputs of said arithmetic logic unit;

an output multiplexor having an input connected to said output of said arithmetic logic unit, said output multiplexor having a first set of outputs representing data output of said arithmetic logic unit and a second output representing sign of said data;

a unidirectional shift register having a plurality of stages, each stage having an output connected to one of a first set of inputs of said input multiplexor in a first bit order and being connected to a second set of inputs of said input multiplexor in a second bit order reversed from said first bit order;

control means for generating a plurality of control signals for controlling the execution of logical operations in said arithmetic logic unit, said plurality of control signals including a first control signal for controlling said first set of inputs to said input multiplexor and a second control signal for controlling said second set of inputs to said input multiplexor so that data from said unidirectional shift register may be gated to said ALU in either said first bit order or in said second bit reversed order as required by the logical operation being executed.

4. A method of executing logical operations in a data processor, comprising the steps of:

loading an operand into a first register;

determining from a logical operation to be executed the direction of shifting required to place a result of said logical operation into said register;

reflecting said operand from said register through an arithmetic logic unit to said register in bit reversed order for those logical operations requiring a shift in a first direction;

executing said logical operation iteratively in said arithmetic logic unit including the step of shifting a result into said register; and reflecting said result from said register through said arithmetic logic unit to said register to place said result in correct bit order for those logical operations requiring a shift in said first direction.

5. A method of executing a divide operation in a data processor having a quotient register capable of shifting only to the right, comprising the steps of:

loading a dividend into said register;

identifying the operation to be executed as a divide operation;

reflecting said dividend from said register through an arithmetic logic unit to said register in bit reversed order;

executing a divide iteration on said dividend;

shifting a quotient bit resulting from said divide iteration to a high order bit position of said register;

repeating said steps of executing and shifting iteratively $n$ times for an $n$ bit quotient; and reflecting said bit reversed order quotient through said arithmetic logic unit to said register in corrected bit order.

* * * * *